July 14, 1942.   A. STUBER ET AL   2,289,740
AUTOMATIC FILM INDICATING DIAL
Filed Feb. 25, 1941
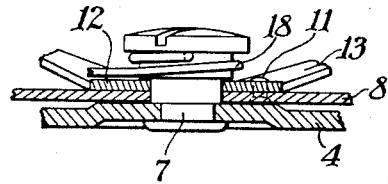
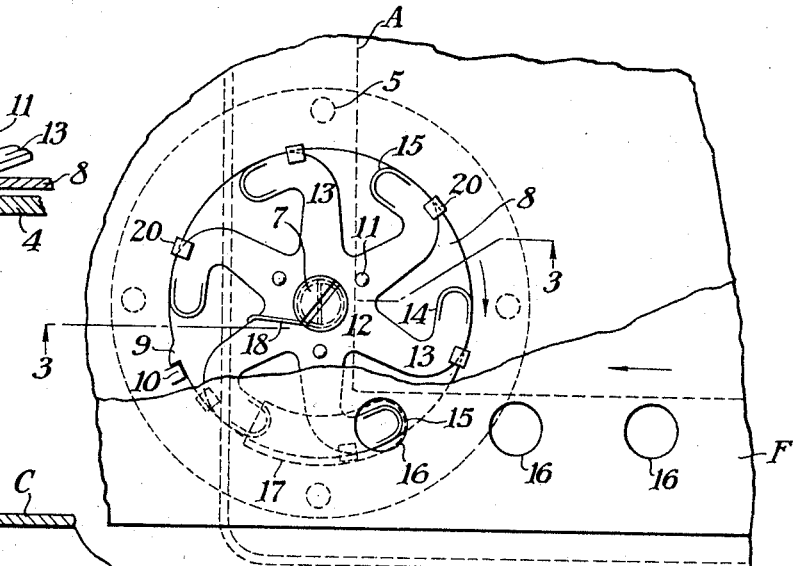
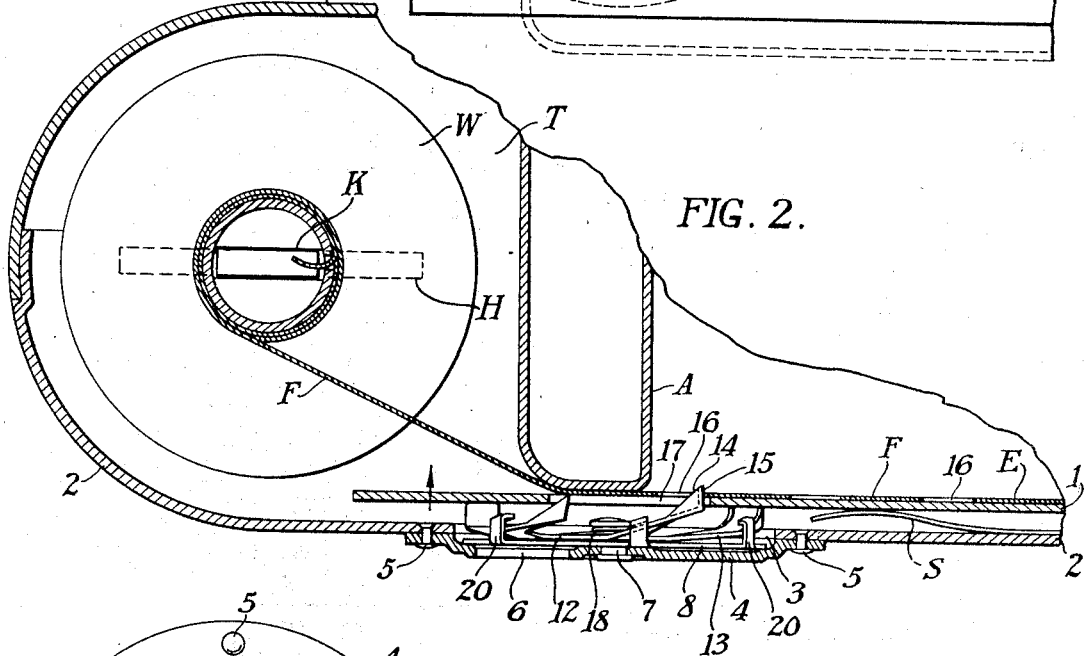
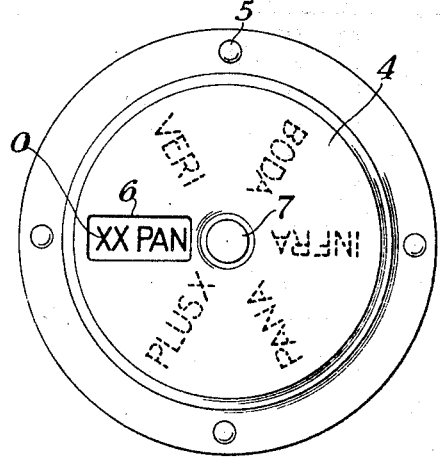
ADOLPH STUBER
MAXWELL H. HILL
INVENTORS
BY
ATTORNEYS Patented July 14, 1942

2,289,740

UNITED STATES PATENT OFFICE 2,289,740

AUTOMATIC FILM INDICATING DIAL

Adolph Stuber and Maxwell H. Hill, Rochester, N. Y., assignors to Eastman Kodak Company, Rochester, N. Y., a corporation of New Jersey Application February 25, 1941, Serial No. 380,500

6 Claims. (Cl. 116—114)

This invention relates to photography and more particularly to photographic cameras. One object of our invention is to provide a camera with an indicating means designating the type of film which may be loaded into the camera. Another object of our invention is to provide an indicating dial which will be automatically set to indicate the kind of film which has been loaded into the camera. Still another object of our invention is to provide a dial which will be automatically moved in loading the camera to the proper position to indicate the type of film in the camera. A still further object of our invention is to provide a dial which will always be restored to a normal position each time the camera back is opened for loading film into the camera. Other objects will appear from the following specification, the novel features being particularly pointed out in the claims at the end thereof.

At the present time there are numerous different types of film which may be used in photographic cameras. These films vary in speed, in color sensitivity, and in the type of emulsion so that it is necessary for a camera operator to know what type of film is in a camera to get the most desirable exposures. Since it often happens that a roll of film is only partially used and some time may elapse before the exposures are completed, it is difficult to remember the particular type of film which is loaded into the camera.

It has been proposed to provide dials on cameras which may be manually set to indicate the film type, but these have not been entirely satisfactory because the operator may readily forget to set the dial. Our present invention is directed to overcoming these difficulties by providing a dial which is automatically set without any attention whatsoever from the operator. Thus, the mere act of loading a film into a camera will automatically set the dial, providing of course that the film is of a special type required for this purpose.

Coming now to the drawing wherein like reference characters denote like parts throughout:

Fig. 1 is a fragmentary plan view of a portion of a camera back showing a preferred embodiment of our invention;

Fig. 2 is a fragmentary section taken through a portion of a camera and approximately on line 3—3 of Fig. 1;

Fig. 3 is an enlarged fragmentary section showing the dial plate and spider mount; and Fig. 4 shows the dial plate mount removed from the camera back as it would appear from the exterior of the camera.

Our invention comprises broadly providing a film with one or more cut-outs, these cut-outs being so positioned that they may engage the spring arms of a spider to adjust a dial plate in accordance with the cut-outs in the film. Since the cut-outs are indicative of the type of film, the dial will always and automatically indicate the type of film loaded in the camera.

In this specification where we refer to film band or strip material, we mean either the ordinary film backing paper, the film strip itself, or a sensitized paper strip which is infrequently used in photographic cameras. It is obvious that, for the purpose of our invention, it is only necessary to provide some form of strip material with apertures or cut-outs to operate our improved form of dial plate.

A preferred embodiment of our invention includes a camera C which may be of any well-known type designed to use roll film cartridges which may include either a film strip alone, a film connected to backing paper, or any other standard type of film strip. The camera C may be provided with the usual camera back 2 which must be moved relatively to the camera body C for loading the film F into the camera. A spool W may be placed in a take-up spool chamber T so that this spool may be turned by the winding key web K operated from the exterior of the camera by the usual handle H. Thus, the film F may be wound across an exposure area E to make an exposure in the usual manner. However, the strip material here shown as a film F is of a special type which includes a series of cut-outs 16 here shown as round apertures, although any other suitable shape may be used if desired.

The movable camera back 2 is provided with a pressure plate I which is normally thrust in the direction shown by the arrow in Fig. 2 by means of one or more springs S. This pressure pad is of known construction and is for holding the film F flat in an exposure position against the exposure frame E.

The camera back 2 includes a cut-out 3 over which a formed-up plate 4 is fastened by means of rivets 5. This plate 4 has a window 6 which may be covered by a transparent sheet if desired. A stud 7 is attached to the center part of the plate 4, this stud forming a pivot on which a dial plate 8 may turn.

The dial plate 8 is provided with a lug 9 which may be normally held against a second lug 10 in a normal position of rest. A spider 12 having spring arms 13 is attached to the dial plate 8 by means of rivets 11 and the ends 14 of the spider arms are provided with flanges which are adapted to engage the cut-out 16 in the film and which form wedge-shaped portions by which these spring arms may be cammed downwardly when the spider arm leaves the film cut-out.

A spring 18 encircling the stud 7 normally tends to hold the spider and dial in the position of rest indicated in Fig. 1.

There is a slot 17 in the plate 1 through which the spider arms may project so that, as a cut-out in the film passes the aperture 17, the spider may be rotated and the amount of rotation of the spider will of course depend upon the number of cut-outs in the film. Thus, with the film shown in Fig. 1 having three cut-outs, the film indicating dial will be moved three steps by three arms of the spider. Since no further cut-outs will pass the slot 17, the dial plate 8 will remain in a fixed position, this being due to the contact of the spider arms 13 with the back of the pressure plate 1, which plate forms a substantially fixed wall of the camera when the camera back is closed and is in the operating position shown in Fig. 2.

After the film has been exposed, it is of course desirable to have the dial plate returned to its initial position. This is accomplished by merely opening the camera back moving it away from the camera body C so that the pressure plate 1 may be thrust away from the camera back by the springs S and release its contact with the spider arms 13. As soon as this frictional contact between the spider arms and a wall of the camera or the pressure plate 1 is relieved, the spring 18 swings the spider to its normal position of rest in Fig. 1 and it is again ready to indicate the type of film when a fresh roll is inserted into the camera.

We prefer to provide small brackets 20 which may, if desired, be carried directly by the dial plate 8 having turned over ends to limit the possible upward movement of the spider arms 13, since it is desirable to hold each arm in a position in which the flange 15 may engage a wall of the cut-out in the film to insure that the spider will be moved by the film cut-out.

It will be obvious that our indicator can be used on any type of film provided with properly located cut-outs and that the cut-outs may be made in the film itself, in the edge of the film, or in the usual type of film backing paper if desired. It is only necessary to have these cut-outs arranged so that, in winding the first film area into place, the dial will be automatically adjusted to the particular type of film being used and so that the type of film indicated by the dial plate character "0" may appear in the window 6.

We claim:

1. In a film indicator for cameras adapted to use roll film cartridges including strip material having one or more cut-outs denoting the type of film, including, in combination, a spool chamber, means for winding film into the spool chamber and through a path, a movable dial plate indicating types of film, and means connected to the dial plate located adjacent the film path and operable by the cut-outs in the strip material for moving said dial automatically as the film strip material is wound in the camera to set said dial plate in accordance with the number of cut-outs in the roll film strip to indicate the type of film being wound therethrough.

2. In a film indicator for cameras adapted to use roll film cartridges including strip material having one or more cut-outs denoting the type of film, including, in combination, a spool chamber, means for winding film into the spool chamber, a movable dial plate indicating types of film, and a spider mounted to move with the dial plate, spring arms carried by the spider positioned to engage and be moved by the cut-outs in the strip material whereby the dial may be automatically adjusted in accordance with the cut-outs in the strip material to indicate the type of film loaded into the camera.

3. In a film indicator for cameras adapted to use roll film cartridges including strip material having one or more cut-outs denoting the type of film, including, in combination, a spool chamber, means for winding film into the spool chamber, a movable dial plate indicating types of film, and a spider mounted to move with the dial plate, spring arms carried by the spider positioned to engage and be moved by the cut-outs in the strip material whereby the dial may be automatically adjusted in accordance with the cut-outs in the strip material to indicate the type of film loaded into the camera, a camera wall lying adjacent the spring arms of the spider and forming therewith frictional means tending to hold the dial in a set position.

4. In a film indicator for cameras adapted to use roll film cartridges including strip material having one or more cut-outs denoting the type of film, including, in combination, a spool chamber, means for winding film into the spool chamber, a movable dial plate indicating types of film, and a spider mounted to move with the dial plate, spring arms carried by the spider positioned to engage and be moved by the cut-outs in the strip material whereby the dial may be automatically adjusted in accordance with the cut-outs in the strip material to indicate the type of film loaded into the camera, a camera back carrying said spider, and being movable relative to said wall whereby the frictional means tending to hold the dial against movement may be released by opening the camera back.

5. In a film indicator for cameras adapted to use roll film cartridges including strip material having one or more cut-outs denoting the type of film, including, in combination, a spool chamber, means for winding film into the spool chamber, a movable dial plate indicating types of film, and a spider mounted to move with the dial plate, spring arms carried by the spider positioned to engage and be moved by the cut-outs in the strip material whereby the dial may be automatically adjusted in accordance with the cut-outs in the strip material to indicate the type of film loaded into the camera, a camera back carrying said spider, and being movable relative to said wall whereby the frictional means tending to hold the dial against movement may be released by opening the camera back, and a spring tending to move the dial to a normal position of rest, said spring being of insufficient strength to move the dial against the friction of the spider arms and camera plate.

6. In a film indicator for cameras adapted to use roll film cartridges including strip material having one or more cutouts denoting the type of film, including, in combination, a spool chamber, means for winding film into the spool chamber, a movable dial plate indicating types of film, and a spider mounted to move with the dial plate, spring arms carried by the spider positioned to engage and be moved by the cut-outs in the strip material whereby the dial may be automatically adjusted in accordance with the cut-outs in the strip material to indicate the type of film loaded into the camera, a camera wall lying adjacent the spring arms of the spider and forming therewith frictional means tending to hold the dial in a set position, and a spring for moving the dial to an initial position of rest when the camera back is opened and the frictional contact of the spider arms and camera wall is removed.

ADOLPH STUBER.
MAXWELL H. HILL.